Aug. 21, 1962    K. H. JENSEN    3,049,861
HOUSING FOR BATTERY DRIVEN CLOCK
Filed July 17, 1958    2 Sheets-Sheet 1

Kaj H. Jensen
INVENTOR.

BY Diggins & Le Blanc
Attorneys

United States Patent Office

3,049,861
Patented Aug. 21, 1962

3,049,861
HOUSING FOR BATTERY DRIVEN CLOCK
Kaj H. Jensen, Bareville, Pa., assignor to Hamilton Watch Company, Lancaster, Pa., a corporation of Pennsylvania
Filed July 17, 1958, Ser. No. 749,163
4 Claims. (Cl. 58—23)

This invention relates generally to battery driven electric clocks and more particularly relates to an improved housing for the movement of such a clock.

It has become commonplace for clock manufacturers to market clock movements to jewellers or others who case the movements in various models and designs of clock cases. This practice permits the same clock movement to be utilized in a wide variety of clock cases having varying prices depending upon the cost of the case itself.

Substantially all of the clock movements marketed in the foregoing manner to the present date have been of the spring-wound type. The present invention comprises a clock housing for a battery driven clock which is economical to manufacture, permits ready access to the battery for insertion and changing and permits a variety of mountings of the movement in cases of differing structural characteristics.

It is accordingly a primary object of the present invention to provide an improved housing for a battery operated clock.

It is another object of the invention to provide an improved housing for a battery operated clock which may be formed primarily of molded plastic having provision for the reception of contacts for connecting the battery to the clock movement.

It is still a further object of the invention to provide an improved electric clock housing of the foregoing type which permits adjustable mounting of the clock movement within the housing.

These and further objects and advantages of the invention will become more apparent upon reference to the following specification and claims and appended drawings wherein:

Figure 1:
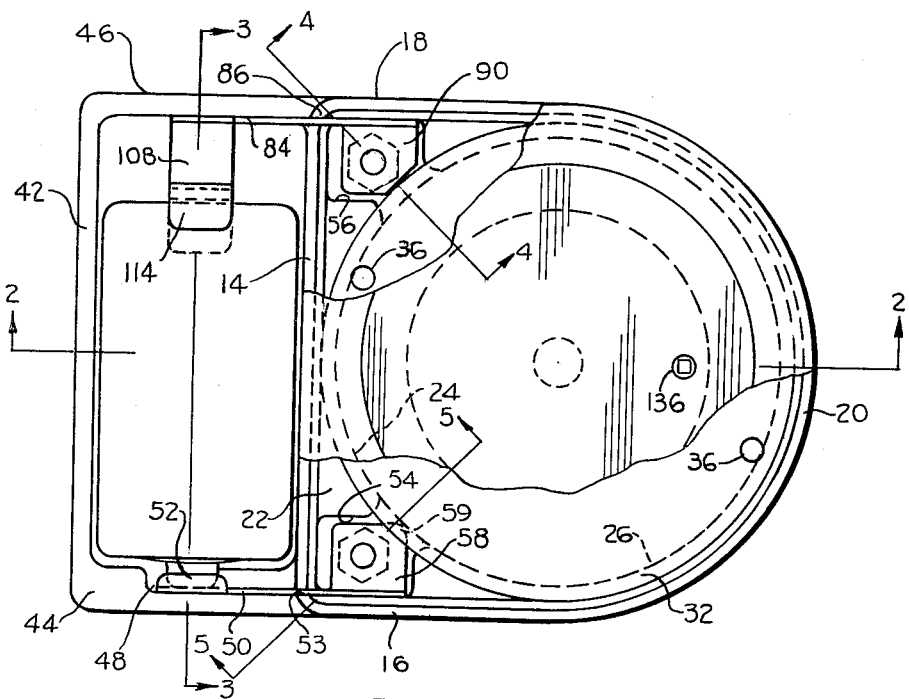
FIGURE 1 is a plan view, partially broken away, showing a clock housing constructed according to the present invention.
Figure 2:
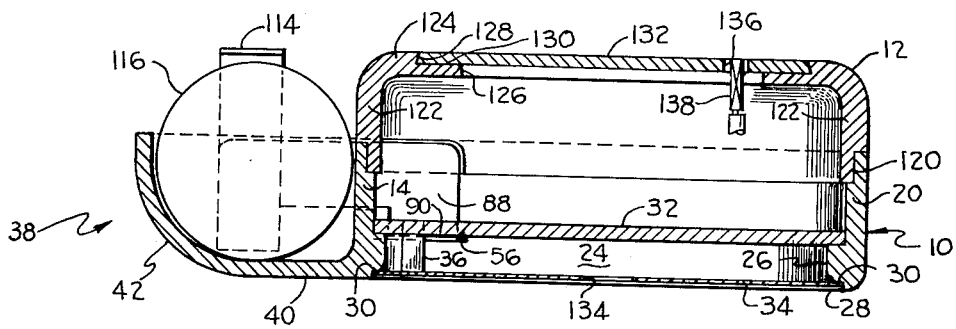
FIGURE 2 is a vertical section taken along the line 2—2 of FIGURE 1.

Referring more particularly to the figures of the drawing and particularly to FIGURE 2, the clock housing consists of a lower half or base 10 and a cover 12. Referring to FIGURE 1, the base 10 has a vertical back wall 14 which is attached at its ends to a pair of vertical side walls 16 and 18. The ends of these side walls 16 and 18 are in turn connected to a rounded vertical end wall 20.

The base 10 has a bottom or floor 22, best seen in FIGURE 1, through which there is provided a large circular bore or aperture 24. The diameter of the aperture 24 is only slightly less than the radius of curvature of the inside surface of the curved end wall 20, so that the floor 22 adjacent to this wall constitutes merely a ledge shown at 26 in FIGURE 2. The floor is provided with a counter bore 28 at the bottom thereof to form a shoulder 30 in the bottom of the base concentrically about the aperture or bore 24.

This housing is designed to hold a battery operated clock of the type shown in Koehler Patent No. 2,662,366. The pillar plate of such a clock is shown at 32 and is mounted on the floor 22 and ledge 26 of the base 10. The diameter of the pillar plate is equal to the radius of curvature of the inner surface of the curved end wall 20 and the dimensions of the base are such that one peripheral edge of the pillar plate engages end wall 14 to locate it in position in the base 10.

The dial train plate of a Koehler type clock is shown at 34 and is received on the shoulder 30 at the bottom of the base 10. According to the preferred embodiment of the invention, the dial train plate 34 is secured to the pillar plate 32 by means of two posts 36 extending between the pillar plate and dial train plate. These posts are received in apertures 37 in the dial train plate and these apertures are connected to slots 39 to permit a resilient fit. It will be seen that when the pillar plate and dial train plate are attached together by means of the posts 36 and holes 37, the entire movement is secured in position in the base 10.

Extending from the back wall 14 is a battery holder generally indicated at 38. This battery holder consists of a flat bottom 40 extending from the lower edge of the back wall 14 and terminating in an upwardly curved end wall 42. A pair of sides 44 and 46 extend outwardly from the ends of end wall 14 to the curved back wall 42.

The inner surface of the side 44 is provided with a recess 48 which receives a contact arm 50 having a bent-over tab 52 at the top end thereof. The contact arm 50 passes through a slot 53 in the back wall 14 of base 10 and extends along the inner surface of the side wall 16.

Figure 5:
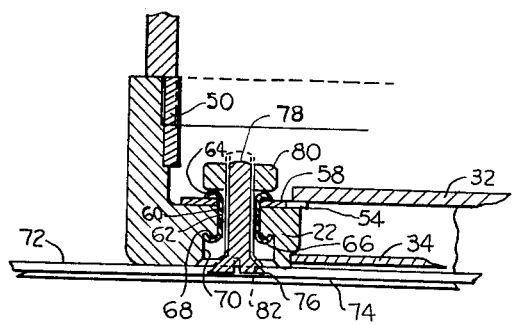
FIGURE 5 is a further detailed vertical section taken along the line 5—5 of FIGURE 1.
Figure 6:
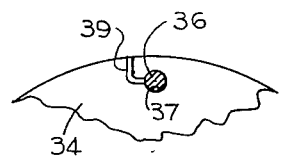
FIGURE 6 is a detailed horizontal section showing the manner of securing the movement in the housing.

The floor 22 adjacent both side walls 16 and 18 is recessed at 54 and 56 by a depth equal approximately to the thickness of the contact arm 50. The end of the contact arm 50 adjacent the inner surface of side wall 16 extends downwardly and terminates in an inwardly bent foot 58 which is received within the recess 54 and extends under the pillar plate 32 to a distance in line with the edge of bore 24. The corner 59 of foot 58 is bent upward slightly to make positive contact with the pillar plate 32. Referring to FIGURE 5, contact foot 58 is secured to the floor 22 by means of an eyelet 60 passing through a suitable aperture in the foot 58 and through an aperture 62 in the floor 22. One end 64 of the eyelet engages the foot 58, while the other end 66 engages a shoulder 68 formed by a counter bore 70 in the floor 22.

The eyelet 60 provides a convenient means for fastening the housed clock movement to a dial backing plate 72 carrying a dial 74. Thus, the dial backing plate may be counter sunk at 76 to receive the flat head of a screw 78 passing through the eyelet 60 and fastened thereto by means of a nut 80. Alternatively, the head of the screw 78 may be silver soldered to the dial backing plate or dial plate 72 as shown, for instance, by the broken lines at 82.

Referring to FIGURE 1, a second contact arm 84 passes through a slot 86 in back wall 14 and extends along the inner surface of side wall 18. The end of this contact arm also extends downwardly as shown at 88 in FIGURE 2 to terminate in a contact foot 90 received within the recess 56 in the floor 22 adjacent the side wall 18.

Figure 4:
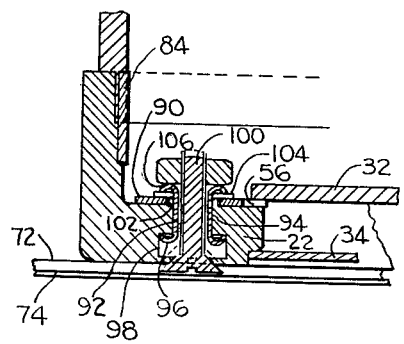
FIGURE 4 is a detailed vertical section taken along the line 4—4 of FIGURE 1.

Referring to FIGURE 4, the contact foot 90 is secured to the floor 22 of the base 10 by means of an eyelet 92 passing through a bore 94. The lower end 96 of the eyelet 92 is received in a shoulder formed by a counter bore 98 and a screw 100 may pass through the eyelet to secure the dial backing plate or dial plate 72 to the housing as explained in detail in connection with FIGURE 5. Inasmuch as both screws 78 and 100 are in electrical contact with the respective contacts and are also in electrical contact with the metal dial backing plate, it is necessary to provide insulation which will prevent shorting the battery. According to one embodiment of the invention, this is provided in FIGURE 4 by means of a raised lip 102 about the bore 94 in the floor 22. The contact foot 90 fits around the lip 102 and an insulating washer 104 is received over the contact foot 90 and is engaged by the upper end 106 of the eyelet 92.

Figure 3:
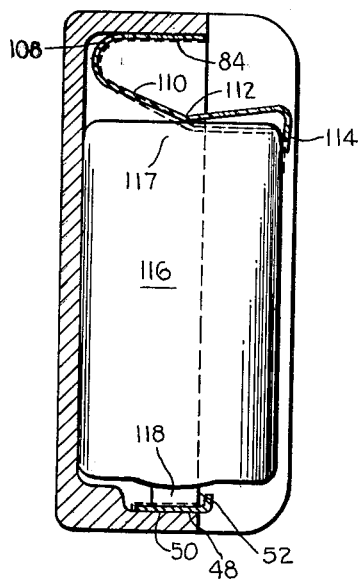
FIGURE 3 is a further vertical section taken along the line 3—3 of FIGURE 1.

The other end of contact arm 84 (see FIGURE 1), on the outside of back wall 14, extends along side 46 to the center of the space between the back wall 14 and the end wall 42 where it is provided with a depending arcuate finger 108. This finger is curved upwardly at 110, as is best seen in FIGURE 3, is bent at 112 and terminates in a substantially horizontal tab 114. When no battery is present in the battery holder the finger assumes the position shown by the broken lines in FIGURE 3. A battery 116 may be inserted by engaging its lower end 117 under the tab 114 and forcing the finger 110 upwardly in FIGURE 3 until, the upper end 118 of the battery can be engaged under tab 52. The battery 116 is maintained in place in all positions of the clock housing by reason of the tabs 114 and 52 but may be readily released by reversing the insertion procedure.

The top edge of the back wall 14, side walls 16 and 18 and curved end wall 20, have the inner upper edges thereof cut away as shown at 120 in FIGURE 2, to receive the conjugately shaped depending edges of the side walls 122 of the cover 12. The side walls 122 of the cover 12 join a top 124 which, according to one embodiment of the invention, is provided with a circular opening 126 concentric with the opening 24 in the bottom of the base 10. The top 124 is counter bored at 128 to form a ledge 130 and may be held in position by simply undercutting the counter bore 128 and conjugately shaping the peripheral edge of the insert 132.

The dial train plate 34 is provided with the conventional bore 134 for receiving the hand-driving shafts of the clock movement, not shown, and the insert 132 is apertured at 136 to receive the setting stem of the movement which is shown at 138. With this type of mounting, it is possible to rotate the entire clock movement within the housing by rotating the pillar plate 32, dial train plate 34, and insert 132. This permits the position of the setting stem 138 to be varied so as to make the clock movement susceptible of mounting in a very large variety of cases. This feature further makes possible the manufacture of individualistically designed clocks without the designer being limited to a particular placement of the setting stem. Where this adjustability feature is not needed, the cover 12 may be mounted with an integral or solid top.

It will be apparent from the foregoing that the clock housing of this invention comprises a base 10 and cover 12 both of which may be molded of synthetic resin with all of the various recesses, apertures, slots, and other necessary designs and shapes therein. The contacts may be secured to the base 10 by simple riveting operations and the housing is then complete and ready for the mounting of the clock movement. The clock movement is in itself readily and easily attached to and assembled within the housing while ready access thereto is permitted by the simple friction fitting cover. The entire unit may be formed of a transparent plastic which affords a full view of the clock movement while protecting it from dust and dirt.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a battery driven clock having a dial train and setting stem, a housing comprising: a base having a recessed floor and a side wall extending upwardly therefrom; said floor having an upper and lower side and said wall having an inner and outer surface; said floor having a large opening therein for receiving said dial train of said clock; a pillar plate removably mounted within said base and being in engagement with said upper side of said floor about said opening; a dial train plate removably mounted to said base and being in engagement with said lower side of said floor about said opening; a battery holder fixedly mounted to said wall; fiirst and second contact means extending from said battery holder to said floor of said base; each of said contact means comprising a planar portion abutting the inner surface of said wall, and a foot extending substantially perpendicular to said planar portion; said foot of said first contact means being retained between said base and said pillar plate and in electrical contact with said pillar plate; said foot of said second contact means being retained between said base and said pillar plate and electrically insulated therefrom; a cover removably mounted to said side wall; said cover including an insert parallel to said floor; and said insert being rotatably mounted to said cover and having an off-center hole therein for receiving said setting stem of said clock.

2. A housing for a battery driven clock in accordance with claim 1 wherein said battery holder comprises: a curvate bottom and planar end wall; said planar end wall having parallel faces and ends; one of said parallel faces of said planar end wall being fixedly attached to said side wall of said base; and parallel end walls connecting said curvate bottom and the parallel ends of said planar end wall.

3. A housing for a battery driven clock in accordance with claim 2 wherein said side wall comprises: a planar end portion upon which said battery holder is mounted; a curvate end portion; parallel side portions upon which said planar portion of said contact means abut; and said parallel side portions connecting said planar and curvate end portions of said side wall.

4. A housing for a battery driven clock in accordance with claim 3 wherein said feet of said contact means are retained between said base and said pillar plate by eyelets which are adapted to pass a bolt for removably mounting said dial train plate to said lower side of said floor about said opening.

References Cited in the file of this patent

UNITED STATES PATENTS

| | | |
|---|---|---|
| 1,009,880 | Adams | Nov. 28, 1911 |
| 1,416,847 | Lewis et al | May 23, 1922 |
| 1,487,293 | Treganza | Mar. 18, 1924 |
| 1,499,783 | Porter | July 1, 1924 |
| 2,089,280 | Loeffler | Aug. 10, 1937 |
| 2,439,154 | Webb | Apr. 6, 1948 |
| 2,473,291 | Moss | June 14, 1949 |
| 2,922,276 | Braitsch et al | Jan. 26, 1960 |

FOREIGN PATENTS

| | | |
|---|---|---|
| 20,717 | Switzerland | Dec. 20, 1899 |
| 309,636 | Switzerland | Nov. 16, 1955 |

UNITED STATES PATENT OFFICE
CERTIFICATE OF CORRECTION

Patent No. 3,049,861                      August 21, 1962

Kaj H. Jensen

It is hereby certified that error appears in the above numbered patent requiring correction and that the said Letters Patent should read as corrected below.

Column 4, line 22, after "said" insert -- side --.

Signed and sealed this 30th day of April 1963.

(SEAL)
Attest: